(12) United States Patent
Gidwani

(10) Patent No.: US 8,842,840 B2
(45) Date of Patent: Sep. 23, 2014

(54) DEMAND BASED ENCRYPTION AND KEY GENERATION AND DISTRIBUTION SYSTEMS AND METHODS

(71) Applicant: Arvind Gidwani, San Diego, CA (US)

(72) Inventor: Arvind Gidwani, San Diego, CA (US)

(*) Notice: Subject to any disclaimer, the term of this patent is extended or adjusted under 35 U.S.C. 154(b) by 28 days.

(21) Appl. No.: 13/667,980

(22) Filed: Nov. 2, 2012

(65) Prior Publication Data

US 2013/0114812 A1 May 9, 2013

Related U.S. Application Data

(60) Provisional application No. 61/555,124, filed on Nov. 3, 2011.

(51) Int. Cl.
*H04L 9/30* (2006.01)
*H04L 9/08* (2006.01)
*H04L 9/28* (2006.01)

(52) U.S. Cl.
CPC ........ *H04L 9/08* (2013.01); *H04L 9/083* (2013.01); *H04L 2209/56* (2013.01)
USPC .......................................... 380/282; 713/165

(58) Field of Classification Search
None
See application file for complete search history.

(56) References Cited

U.S. PATENT DOCUMENTS

| | | |
|---|---|---|
| 2006/0272028 A1* | 11/2006 | Maes ............................... 726/27 |
| 2009/0202081 A1* | 8/2009 | Hammad et al. ............... 380/285 |
| 2010/0325423 A1* | 12/2010 | Etchegoyen .................... 713/153 |
| 2011/0007895 A1* | 1/2011 | Wysocki et al. ................. 380/30 |
| 2011/0246767 A1* | 10/2011 | Chaturvedi et al. ........... 713/164 |

\* cited by examiner

*Primary Examiner* — Venkat Perungavoor
(74) *Attorney, Agent, or Firm* — Thomas |Horstemeyer, LLP

(57) ABSTRACT

Systems and methods providing a key management platform that generates and distributes demand-based encryption and decryption keys are described. In one embodiment, among others, a key management system comprises a processor to receive, from a requester system, a request to generate a private encryption key and a public encryption key; receive, from the requester system, identification information identifying a receiver system; generate a first private encryption key and a first public encryption key in response to receiving the request; send the first private encryption key to the requester system; and send the first public encryption key to the receiver system.

25 Claims, 3 Drawing Sheets

DEMAND BASED ENCRYPTION AND KEY GENERATION AND DISTRIBUTION SYSTEMS AND METHODS

CROSS-REFERENCE TO RELATED APPLICATIONS

This application claims priority under 35 U.S.C. §119(e) to U.S. Provisional Patent Application Ser. No. 61/555,124, filed Nov. 3, 2011, entitled DEMAND BASED ENCRYPTION AND KEY GENERATION AND DISTRIBUTION, the content of which is hereby incorporated by reference herein in its entirety for all purposes.

FIELD OF THE DISCLOSURE

The disclosure relates generally to systems and methods providing a key management platform that generates and distributes demand-based encryption and decryption keys.

BACKGROUND OF THE DISCLOSURE

Current encryption standards are predominantly implemented in server-type resources in which data is sent to a central server and encrypted as a backend process. A decryption key is then sent to the end user for local use. Such methods fail to address direct peer-to-peer environments such as communication between mobile devices, including CDMA, UMTS, GSM, LTE and other formats as well as communications over WIFI, WI-MAX, variants of 802.11x, and emerging standards.

SUMMARY OF THE DISCLOSURE

In accordance with the present disclosure, a computer-implemented method, a system and a computer program product comprising a computer usable medium having a computer readable program code embodied therein that is adapted to be executed to implement a method for providing on-demand encryption and key generation and distribution are described.

Certain methods, systems and computer program products may generate a request, identification information identifying a receiver system, and one or more use parameters associate with a data file; send the request to a key management system, wherein the sending of the request is configured to cause the key management system to generate a private encryption key and a public encryption key; send the identification information to the key management system, wherein the sending of the identification information is configured to cause the key management system to send the public encryption key to the receiver system; send the use parameters to the key management system, wherein the sending of the use parameters is configured to cause the key management system to generate the public encryption key based on the use parameters; generate payment information; send the payment information to the key management system, wherein the sending of the payment information is configured to cause the key management system to generate the private encryption key and the public encryption key upon authentication of the payment information; receive the private encryption key from the key management system; modify the data file with the use parameters before the data file is encrypted; encrypt the data file using the private encryption key; send the encrypted data file to the receiving system; send an access instruction to the receiving system, wherein the sending of the access instruction is configured to prohibit the receiving system from accessing the data file after a first number of access attempts by the receiving system and after an elapsed time period from when the encrypted data file was sent to the receiving system; receive a notification relating to an attempt, by the receiving system, at taking an action in relation to the data file; generate, based on the notification, an instruction configured to deny the action; and/or send the instruction to the receiving system, wherein the sending of the instruction is configured to prevent the receiving system from completing the action. A processing component may encrypt the data file based on the use parameters. Use parameters may specify an expiration date of the public encryption key.

Other methods, systems and computer program products may receive, from a requester system, a request to generate a private encryption key and a public encryption key; receive, from the requester system, identification information identifying a receiver system; generate a first private encryption key and a first public encryption key in response to receiving the request; send the first private encryption key to the requester system; receive, from the requester system, use parameters; generate, based on the use parameters, the first public encryption key; send the first public encryption key to the receiver system; send an instruction specifying the use parameters to an application running on the receiving system, wherein the application controls access to an encrypted data file that was received from the requester system by the receiver system based on the instruction specifying the use parameters; generate one or more passcodes associated with the first private encryption key and the first public encryption key; send at least one of the passcodes to the requester system; and/or send at least one of the passcodes to the receiver system.

BRIEF DESCRIPTION OF THE DRAWINGS

The present application may be more fully appreciated in connection with the following detailed description taken in conjunction with the accompanying drawings.

DETAILED DESCRIPTION OF THE DISCLOSURE

Various aspects of the disclosure are described below. It should be apparent that the teachings herein may be embodied in a wide variety of forms and that any specific structure, function, or both, being disclosed herein is merely representative. Based on the teachings herein one skilled in the art should appreciate that any aspect disclosed may be implemented independently of any other aspects and that two or more of these aspects may be combined in various ways. For example, a system may be implemented or a method may be practiced using any number of the aspects set forth herein.

This disclosure relates generally to one or more systems, methods, and computer program products for distributing encryption information. Generally, the disclosure may be implemented to provide services to a user to generate encryption keys to protect content and to communicate the associated encryption keys to one or more appropriate users. Furthermore, the disclosed system may be used to incorporate other security features, such as temporal, geographical, and usage restrictions into the encrypted file. Each of these services may be provided on-demand and in response to user selected inputs. Encryption of any type of content is contemplated, including content stored in any format (e.g., PDG, JPEG, WORD, EXCEL, and others) and containing any type of information (e.g., video, audio, text, and others).

Additional details are provided in the examples below.

Example Systems

Figure 1:
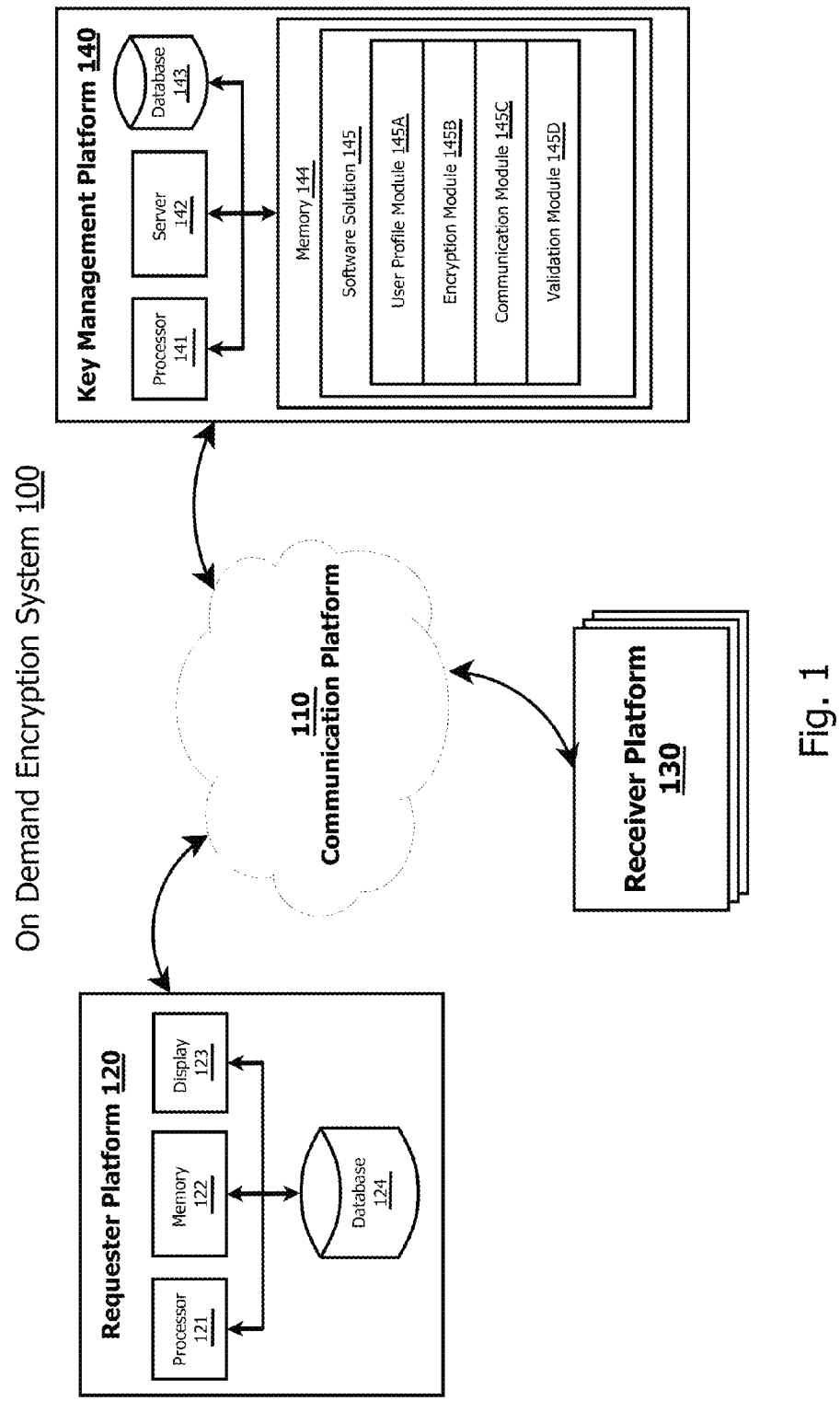
FIG. 1 shows a block diagram depicting an on-demand encryption system for generating and distributing encryption information in response to user request.

Attention is first drawn to FIG. 1, which depicts certain aspects of the disclosure relating to an on-demand encryption system 100 for generating and distributing encryption information in response to user request. The system 100 may be configured to include a communication platform 110, a requester platform 120, a receiver platform 130, and a key management platform 140. The term "platform" as used herein may refer to a single component, a grouping of remote components at multiple locations, or a centralized grouping of components at a single location. A platform may include components that may be hosted by, or services that may be offered by parties other than those directly associated with each platform. A platform may further include hardware, software, or other solutions and other components configured to exchange and process data and instructions using various protocols across various network communication pathways. Certain aspects of each platform are described in more detail below. It is to be understood that the description herein is not intended to be limiting, and alternative embodiments are contemplated as understood by one of skill in the art.

Communication Platform 110

The communication platform 110 may be configured to provide communication links among the various other platforms. For example, the communication platform 110 may utilize any one or a combination of known communication networks and connections to facilitate communication in the system 100, including the Internet, private networks, local area networks, cellular or other over-the-air wireless carrier interfaces (e.g., CDMA, UMTS, GSM, LTE), Bluetooth, Wi-Fi, and other wired and wireless communication pathways. Any communication network may be utilized alone or in combination to provide connectivity for the system 100.

Requester Platform 120

The requester platform 120 may include any suitable computing device that is configured to allow a user to interact with other platforms of the system 100. For example, the user device may be any of numerous general purpose or special purpose computing system environments or configurations. Examples of well-known computing devices, systems, environments, and/or configurations thereof that may be suitable for use in accordance with particular embodiments of the disclosure include, but are not limited to, personal computers, hand-held or laptop devices, mobile phones, tablet and e-readers, and programmable consumer electronics. The requester platform 120 may include various components, including a processor 121, a display 123, a database 124, a camera (not shown), an input/output interface (e.g., a touch screen, keyboard, mouse) (not shown), and memory 122 from which software may be executed. The requester platform 120 may also include various software applications, including those that operate in conjunction with a web browser (e.g., through a LAN connection or radio link), and those that operate without web connectivity.

Receiver Platform 130

Similar to the requester platform 120, the receiver platform 130 may include any suitable computing device that is configured to allow a user to interact with other platforms of the system 100. For example, the user device may be any of numerous general purpose or special purpose computing system environments or configurations. Examples of well-known computing devices, systems, environments, and/or configurations thereof that may be suitable for use in accordance with particular embodiments of the disclosure include, but are not limited to, personal computers, hand-held or laptop devices, mobile phones, tablet and e-readers, and programmable consumer electronics. Moreover, the receiver platform 130 may also include the various components (e.g., processor, display, database, input/output interfaces, memory, etc.) described in the requester platform 120, although not shown in the receiver platform 130 of FIG. 1. The receiver platform 130 may also include various software applications, including those that operate in conjunction with a web browser (e.g., through a LAN connection or radio link), and those that operate without web connectivity.

In one embodiment, the requester platform 120 and the receiver platform 130 may each be implemented on a mobile phone device. An application, stored in the phone's memory, may be utilized by a user to choose encryption and decryption methods (where additional applications may perform the actual encryption and decryption), set or monitor expiration and usage parameters relating to encrypted or decrypted content, and to interact with the key management platform 140. The application may be further configured to provide other features of the system 100 as described in more detail below. One skilled in the art will appreciate that the requester and receiver platforms may be configured to operate on other similar devices such as computers, notebooks, PDAs, web browsers, and other peer to peer environments.

Key Management Platform 140

In general, the key management platform 140 may be configured to control the generation and distribution of encryption information for the system. Although not shown, the key management platform 140 may reside on the requester platform 120 (e.g., in a secure location of the requester platform 120). Specifically, the key management platform 140 may generate encryption information, such as private and public keys, in response to user requests (e.g., from the requester platform 120). Moreover, the key management platform 140 may set parameters relating to use of encrypted content. The key management platform 140 may be further configured to serve as a central provider of encryption services to both requester and receiver users, and may control the encryption and distribution of files.

In accordance with certain aspects of the disclosure, the management platform 140 may include, one or more input/output interfaces (not shown), processors 141, servers 142, databases 143, memory 144, or similar components. One of skill in the art will appreciate that some or all of the functionality of the management platform 140 described in further detail below may be performed at one or a combination of the other platforms.

The database 143 may be referred to herein as a hard disk drive for convenience, but this is not required, and one of ordinary skill in the art will recognize that other storage media may be utilized without departing from the scope of the disclosure. In addition, one of ordinary skill in the art will recognize that the database 143 which is depicted as a single storage device, may be realized by multiple (e.g., distributed) storage devices. It is further contemplated that the database 143 may include one or more types of a databases, including hierarchical databases, network databases, relational databases, non-relational databases, object-oriented databases, or another type of database able to handle various data types (e.g., structured data that fits nicely into fields, rows, and columns, or data from various media sources such as graphics, photographs, audio, and video structured data. For example, the database 143 may store data in a fixed file format, such as XML, comma separated values, tab separated values, or fixed length fields. Alternatively, the database 143 may store data in a non-fixed file format (e.g., a NoSQL database).

As further shown in FIG. 1, the key management platform 140 may comprise a software solution 145 with various modules implemented in software, including: (i) a user profile module 145A; (ii) encryption module 145B; (iii) communication module 145C; and (iv) validation module 145D.

The processor 141 may be configured to execute instructions embodied in the software solution 145, which may be stored in memory 144. One of skill in the art will appreciate that the software solution 145 may be configured to operate on personal computers (e.g., handheld, notebook or desktop, cell phones, PDA, consumer electronics, etc.), servers (e.g., a single server configuration or a multiple server configuration), or any device capable of processing instructions embodied in executable code. Moreover, one of ordinary skill in the art will recognize that alternative embodiments, which implement one or more components of the disclosure in hardware, are within the scope of the disclosure.

Attention is now drawn to modules 145A-D of the software solution 145. Modules 145A-D may operate in concert with each other to perform certain functions of the software solution 145, as described herein.

User Profile Module 145A

The user profile module 145A may be configured to collect and organize information on users who interact with the system. The user profile module 145A may prompt appropriate user data at the user devices (e.g., at the requester platform 120 and the receiver platform 130). For example, user data may include name, address, payment information, and other related user information. The data may then be organized into a user profile which a user may utilize to make subsequent encryption purchases or other interactions with the key management platform 140. A user may be provided with a user name and password associated with the user's profile to enable the key management platform 140 to authenticate the user and access any profile data or stored encryption data. The user profile module 145A may be further configured to associate encryption with particular devices or other security options which may apply to future encryption requests.

Encryption Module 145B

The encryption module 145B may be configured to generate encryption information in accordance with many available encryption protocols. Specifically, the encryption module 145B controls the generation of encryption keys that incorporate use parameters concerning the encryption. One skilled in the art will appreciate that many encryption algorithms exist and may include, but is not limited to, for example, hash encryption and RSA encryption standards. The use parameters may form part of the encryption key, may be embedded into the encrypted content (e.g., as part of metadata), or may be set forth in a separate file. The use parameters may be operated on by various means, including computer applications that interpret the use parameters, monitor conditions associated with the use parameters, and control access to encrypted or decrypted content based on the use parameters. In accordance with some aspects, content received by a receiver platform 130 may "self-destruct" when an application running on the receiver platform 130 in a protected determines that certain use parameters have been met, and then deletes the content. Encryption keys may also employ digital rights management (DRM) access control technologies that limit the use of the content after receipt (e.g., using persistent online authentication, using metadata in the key or the encrypted content that includes information relating to use parameters, and other technologies).

In one embodiment, the encryption module 145B may generate a private and public encryption key pair, and then send one key of the pair to the requester platform 120, where that key is used to encrypt a file residing at the requester platform 120, and also send the other key of the pair to the receiver platform 130. Alternatively, a user may provide the file to be encrypted to the key management platform 140 and the encryption module may prepare (e.g., security scan) and encrypt the file into a format to be sent back to the requester. The encrypted file may instead be kept at the key management platform 140 so it may be downloaded and decrypted at a later time. The encryption module may also provide decryption services to a receiving user either through upload of an encrypted file with the correct associated public key or a user may download the encrypted file from the key management platform 140 after correctly providing the associated public key.

Communication Module 145C

The communication module 145C may be configured to provide communication services from the key management platform 140 to the other platforms. The communication module 145C may be further configured to utilize encrypted communications to allow secure transmission of information from the key management platform 140. Private and public key security may be compromised if the communication of the keys and other associated information is not protected during transmission to the user platforms 120-130. The communication module 145C may provide security when transmitting sensitive data over the communications platform 110. One skilled in the art will appreciate the many known methods for data security and encryption over communication networks and should not be read in a limiting sense.

Validation Module 145D

The validation module 145D may be configured to validate keys that have been transmitted to users. The validation module 145D may store information about each encryption which may be utilized by users to verify that the correct key has been provided. The validation module 145D may also provide other known validation techniques to ensure that keys are transmitted to users error free.

Example Processes

Figure 2:
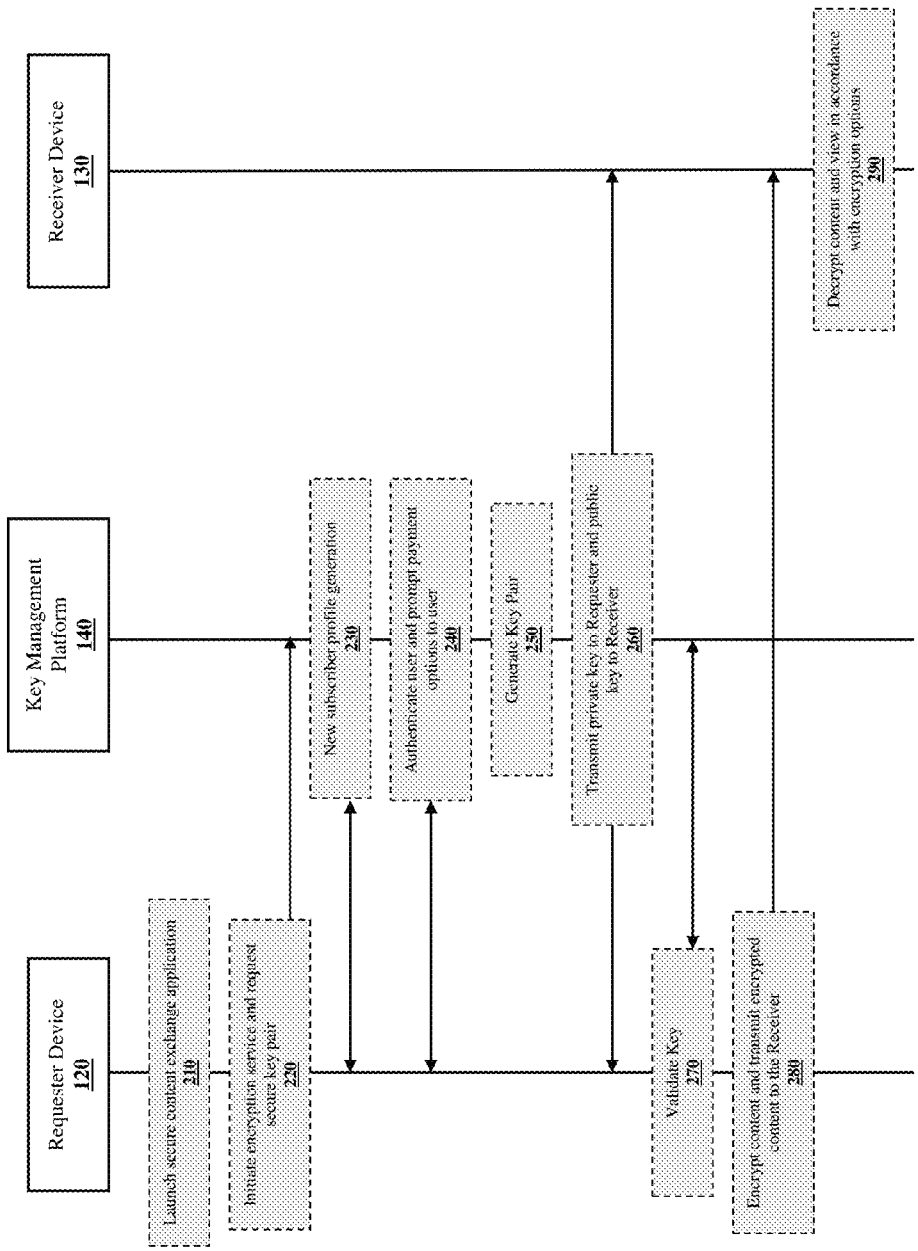
FIG. 2 illustrates a process flow diagram detailing a process relating to the on-demand encryption system of FIG. 1.

Attention may now be drawn to FIG. 2, which illustrates a high level process flow diagram detailing the data communication process flow for implementing certain features of the system 100 of FIG. 1. As shown, the process flow may be executed through data exchange between several components, including a requester platform 120, a receiver platform 130, and a key management platform 140.

At step 210, a user of the requester platform 120 may launch a secure content exchange application. At step 220, the launched application may initiate an encryption service and communicate with the key management platform 140. Once communication between the requester platform 120 and the key management platform 140 is established, a user may be presented with options for acquiring a particular type of encryption, for setting use parameters, and for setting an intended recipient at the receiver platform 130. For example, different types of encryption (e.g., hash, RSA, etc.) may be made available to the user. Each type of standard encryption algorithm may offer unique benefits to a particular user. Additionally, a user may choose additional security features such as a pass phrase to further protect the user's content.

In addition to security features, a user may be presented with options regarding any usage parameters the user wishes to set, where access privileges to encrypted or decrypted content may become invalid based on various conditions. For instance, a user may limit decryption by a particular device identified by, for example, its IP address, MAC address, serial number, or other unique identifying information associated with a particular device, which may prevent unauthorized copying or moving of encrypted or decrypted content to unauthorized devices. Particular information about a user may also be used, including date of birth, social security numbers, phone number, residence address, email address, driver license number or other digital fingerprints.

Moreover, a user may limit whether the content may be copied or altered and may restrict the number of times the content may be viewed or decrypted. The restrictions may also be temporal (e.g., content may only be decrypted within a particular time period accounting for time zones associated with users), or the restrictions may be geographically (e.g., content may only be decrypted by a device within a certain geographic area of the world as determined by geo-fencing technologies and other location technologies). The restrictions may also require re-encryption of the information, its subparts, or its subsequent versions, before it can be forwarded to another user or device. The restrictions may further require action on the part of the receiving user (e.g., the decrypted information must be moved to a secure file identified by the requesting user). Finally, a user may choose to request encryption which may be opened by either a single receiver or multiple receivers, and may wish to set different use parameters for each receiver, or may wish to set use parameters that are dependent upon certain actions associated with use of the encrypted content over time and by some or all of the receivers.

Status updates and alerts may also be sent to requester platform 120 or key management platform 140. The platforms 120 and 140 may, in response to the updates and alerts, initiate control over use of the originally encrypted content.

Once a user has selected the type of encryption desired and the appropriate options, the application may communicate a request to the key management platform 140. All of the information communicated concerning the user's encryption request may be included in the communication.

At step 230, the key management platform 140 receives a request for encryption and determines whether the user is a known user or new user. If the user is unknown, the key management platform 140 may communicate with the requester platform 120 to facilitate an exchange of new user information. For example, a new user may input their name, address, billing information, and other user related information as well as agree to appropriate documentation before the key management platform 140 will distribute any encryption information to the requester 120 or receiver devices 130. Once the user information is gathered, the key management platform 140 generates a user profile for the new user which may be used in the future to identify the particular user. As previously discussed the user profile may be stored in the database 143.

At step 240, the key management platform 140 may authenticate a user, utilizing the user's profile generated at step 230. Once authenticated, the key management platform 140 may also communicate with the requester platform 120 to gather any additional data or configuration options as needed.

Payment options may also be presented to the user to pay for the encryption service. A user may choose to pay on monthly installments for limited or unlimited use, or may choose to purchase individual, upon-use encryption services as needed. Alternative subscription services known in the art are also contemplated. Depending on the subscription service, the price may vary with the type of encryption requested and the additional security and usage parameters selected by the user. Using the requester platform 120, the user may input appropriate payment information (e.g., credit card, checking account, etc.) and the key management platform 140 may process the payment.

At step 250, the key management platform generates the encryption information according to the user's request. One skilled in the art will appreciate that different types of encryption require different types of data to be generated. For example, RSA encryption involves the generation of a public and private key. Encrypted content may only be decrypted by matching the appropriate public key with the private key.

Due to the differences in encryption methods and the required data associated with each, the key management platform 140 may utilize a number of different methods for providing encryption services depending on the particular demands. In one embodiment, the generated private and public keys may be distributed to the requester platform 120 as well as to the receiver platform 130, where the actual encryption and decryption of content occurs at those platforms. However, in another embodiment the requesting user may communicate or "upload" the content to be encrypted to the key management platform 140 for encryption using the requester platform 120. Since the uploaded content (e.g., file) is available to the key management platform 140, the file may be scanned for security issues and the selected encryption method may be embedded into the content's file itself. This method may increase security because, in the case of RSA encryption, the private key may be encapsulated into the file at the key management platform 140 eliminating the need to transmit the private key to the requester platform 120 and reducing the risk of security compromise. Moreover, by limiting the availability of the private key to the users of the system, the encryption key generation method may be better protected from unscrupulous individuals gathering, or "mining," public and private keys in an attempt to break the key generation algorithm. This method may also help protect against a user that misplaces the private key or, for some reason, does not encrypt the user's file using the correct private key (e.g., input mistakes, copy errors, etc.). Generally, the key management platform 140 may act as a central hub which may control the encryption and distribution of user files.

At step 260, the generated keys are communicated to the appropriate users at associated platforms. A private key may be distributed to the requesting user at the requester platform 120. Similarly, the associated public key may be distributed to the receiving user at the receiver platform 130. Any communication link or protocol may be used to transmit the keys; however, a secure encrypted communication link may be used to increase security.

At step 270, the requester user may validate the private key which has been transmitted. Any error in the private key may prevent the encryption algorithm from successfully encrypting or decrypting a file. Validation of the keys, once received at the requester platform 120 may help to ensure that the private key has been accurately transmitted. In one embodiment, verification of the private key may be facilitated by communicating with the key management platform 140 to check that the private key received matches the private key which was transmitted. (Similar validation may occur in relation to the public key between the receiver platform 130 and the key management platform 140.)

At step 280, a user at the requester platform 120 may encrypt the content file using the private key which was provided by the key management platform 140. Once encrypted the file may be transmitted to the receiver platform 130. Transmission may occur over various means, including ftp, sftp, https, http, tcp stack applications, and other peer-to-peer technologies known in the art. Use parameters may also be set by a user at the requester platform 120 (as opposed to at the key management platform 140).

At step 290, the receiver user may decrypt the file at the receiver platform 130. Once decrypted the content may be viewed or otherwise interacted with by the receiver user. The other security options chosen by the requester, such as temporal or geographical restrictions, may take effect and limit how the receiver user interacts with the content. Such restrictions may be autonomously enforced at the receiver platform 130 (e.g., via a software module for controlling access to encrypted or decrypted content), or may be enforced by instructions/permissions received from the requester 120 or the key management platform 140 via the communication platform 110.

Figure 3:
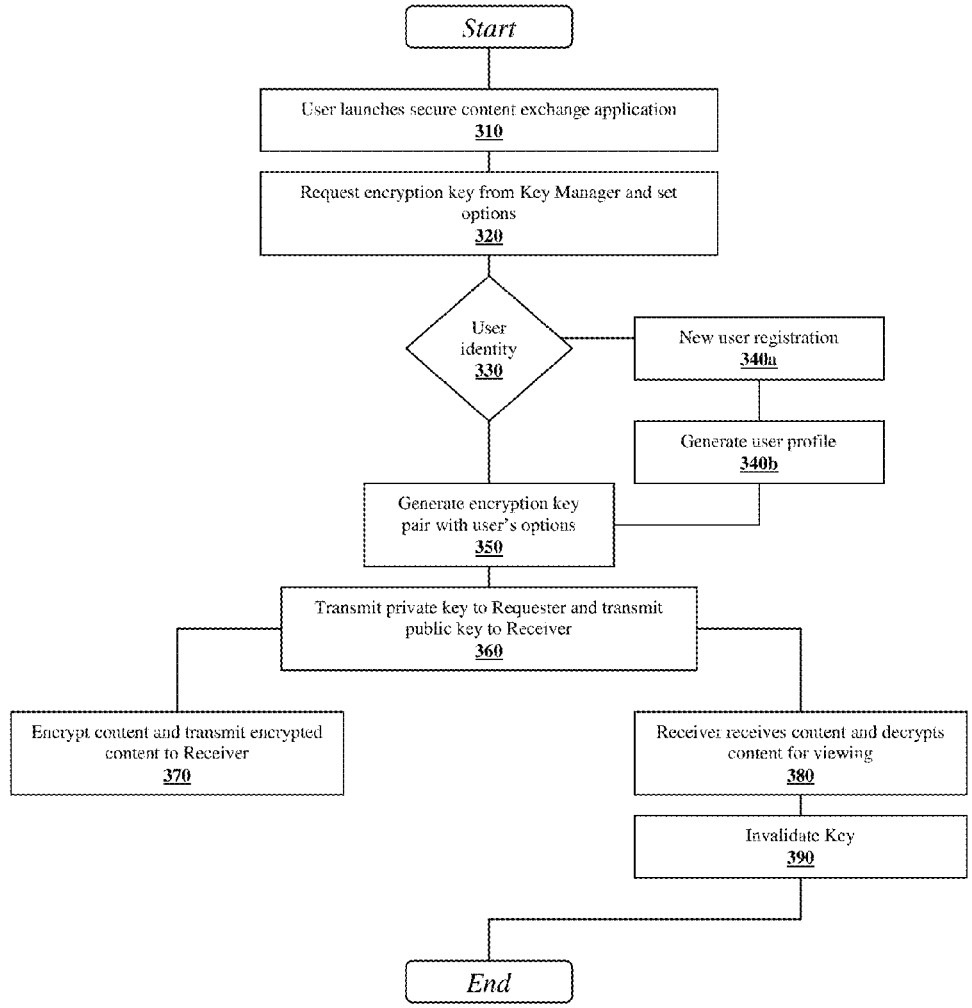
FIG. 3 illustrates a process flow diagram detailing a process relating to the on-demand encryption system of FIG. 1.

Attention may now be drawn to FIG. 3, which illustrates a high level process flow diagram detailing the encryption process for implementing certain features of the requester 120 and receiver platforms 130. The flow of FIG. 3 is similar to that of FIG. 2.

At step 310, a user may launch a secure content exchange application. At step 320, the user may select options regarding encryption methods and security features and may communicate a request to the key management platform 140.

At step 330, the system may attempt to authenticate a user. If the user is unknown to the system, it may generate prompts to gather appropriate user data. At step 340a, the user inputs the appropriate information and registers as a new user to the system. A user may be provided with a username and password. At step 340b, the user data is organized and stored to generate a user profile which may be utilized in the future to authenticate a particular user.

At step 350, encryption information such as private and public key pairs are generated in accordance with the user's preferences. At step 360, the private and public keys are transmitted to the requester and receiver user's respectively.

At step 370, a user may use the provided private key to encrypt content to be transmitted to the receiver. At step 380, a receiver user acquires the encrypted content and may use the previously received public key to decrypt and access the content. Finally, at step 390, the encryption keys may become invalidated in accordance with user selected security protocols or in response to user actions.

Variations to Embodiments

It is understood that the specific order components disclosed herein are examples of exemplary approaches. Based upon design preferences, it is understood that the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In accordance with certain aspects of the present disclosure, one or more of the process steps described herein may be stored in memory as computer program instructions. These instructions may be executed by a digital signal processor, an analog signal processor, and/or another processor, to perform the methods described herein. Further, the processor(s), the memory, the instructions stored therein, or a combination thereof may serve as a means for performing one or more of the method steps described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the disclosure.

Aspects of the present disclosure are typically carried out in or resident on a computing network. The computing network generally includes computer hardware components such as servers, monitors, I/O devices, network connection devices, as well as other associated hardware. In addition, the aspects and features described below may include one or more application programs configured to receive, convert, process, store, retrieve, transfer and/or export data and other content and information. As an example, these aspects and features may include one or more processors that may be coupled to a memory space comprising SRAM, DRAM, Flash and/or other physical memory devices. Memory space may be configured to store an operating system (OS), one or more application programs, such as a UI program, data associated with the pertinent aspect or feature, applications running on processors in the device, user information, or other data or content. The various aspects and features of the present disclosure may further include one or more User I/O interfaces, such as keypads, touch screen inputs, mice, Bluetooth devices or other I/O devices. In addition, the certain aspects and features may include a cellular or other over the air wireless carrier interface, as well as a network interface that may be configured to communicate via a LAN or wireless LAN (WiLAN), such as a Wi-Fi network. Other interfaces, such as USB or other wired interfaces may also be included.

As used herein, computer program products comprising computer-readable media including all forms of computer-readable medium except, to the extent that such media is deemed to be non-statutory, transitory propagating signals.

While various embodiments of the present disclosure have been described in detail, it may be apparent to those skilled in the art that the present disclosure can be embodied in various other forms not specifically described herein.

The invention claimed is:

1. A requester system, the system comprising:
a processor operable to:
generate a request, identification information identifying a receiver system, and one or more use parameters associate with a data file;
send the request to a key management system, wherein the sending of the request is configured to cause the key management system to generate a private encryption key and a public encryption key;
send the identification information to the key management system, wherein the sending of the identification information is configured to cause the key management system to send the public encryption key to the receiver system;
receive the private encryption key from the key management system;
encrypt the data file using the private encryption key and based on the use parameters; and
send the encrypted data file to the receiver system.

2. The requester system of claim 1, wherein the processor is further operable to:
send the use parameters to the key management system, wherein the sending of the use parameters is configured to cause the key management system to generate the public encryption key based on the use parameters.

3. The requester system of claim 2, wherein the use parameters specify an expiration date of the public encryption key.

4. The requester system of claim 1, wherein the processor is further operable to:
modify the data file with the use parameters before the data file is encrypted.

5. The requester system of claim 1, wherein the processor is further operable to:
generate payment information; and
send the payment information to the key management system, wherein the sending of the payment information is configured to cause the key management system to generate the private encryption key and the public encryption key based upon authentication of the payment information.

6. The requester system of claim 1, wherein the processor is further operable to:
send an access instruction to the receiver system, wherein the sending of the access instruction is configured to prohibit the receiver system from accessing the data file after a first number of access attempts by the receiver system and after an elapsed time period from when the encrypted data file was sent to the receiver system.

7. The requester system of claim 1, wherein the processor is further operable to:
receive a notification relating to an attempt, by the receiver system, at taking an action in relation to the data file;
generate, based on the notification, an instruction configured to deny the action; and
send the instruction to the receiver system, wherein the sending of the instruction is configured to prevent the receiver system from completing the action.

8. A requester system, the system comprising:
a processor operable to:
generate a request, identification information identifying a receiver system, and one or more use parameters associate with a data file;
send the request to a key management system, wherein the sending of the request is configured to cause the key management system to generate a private encryption key and a public encryption key;
send the use parameters to the key management system, wherein the sending of the use parameters is configured to cause the key management system to generate the public encryption key based on the use parameters;

send the identification information to the key management system, wherein the sending of the identification information is configured to cause the key management system to send the public encryption key to the receiver system;

receive the private encryption key from the key management system;

encrypt the data file using the private encryption key; and send the encrypted data file to the receiver system.

9. The requester system of claim 8, wherein the use parameters specify an expiration date of the public encryption key.

10. The requester system of claim 8, wherein the processor is further operable to:

modify the data file with the use parameters before the data file is encrypted.

11. The requester system of claim 8, wherein the processor is further operable to:

generate payment information; and send the payment information to the key management system, wherein the sending of the payment information is configured to cause the key management system to generate the private encryption key and the public encryption key based upon authentication of the payment information.

12. The requester system of claim 8, wherein the processor is further operable to:

send an access instruction to the receiver system, wherein the sending of the access instruction is configured to prohibit the receiver system from accessing the data file after a first number of access attempts by the receiver system and after an elapsed time period from when the encrypted data file was sent to the receiver system.

13. The requester system of claim 8, wherein the processor is further operable to:

receive a notification relating to an attempt, by the receiver system, at taking an action in relation to the data file;

generate, based on the notification, an instruction configured to deny the action; and send the instruction to the receiver system, wherein the sending of the instruction is configured to prevent the receiver system from completing the action.

14. A requester system, the system comprising:

a processor operable to:

generate a request, identification information identifying a receiver system, and one or more use parameters associate with a data file;

send the request to a key management system, wherein the sending of the request is configured to cause the key management system to generate a private encryption key and a public encryption key;

send the identification information to the key management system, wherein the sending of the identification information is configured to cause the key management system to send the public encryption key to the receiver system;

receive the private encryption key from the key management system;

modify the data file with the use parameters before the data file is encrypted;

encrypt the data file using the private encryption key; and send the encrypted data file to the receiver system.

15. The requester system of claim 14, wherein the use parameters specify an expiration date of the public encryption key.

16. The requester system of claim 14, wherein the processor is further operable to:

generate payment information; and send the payment information to the key management system, wherein the sending of the payment information is configured to cause the key management system to generate the private encryption key and the public encryption key based upon authentication of the payment information.

17. The requester system of claim 14, wherein the processor is further operable to:

send an access instruction to the receiver system, wherein the sending of the access instruction is configured to prohibit the receiver system from accessing the data file after a first number of access attempts by the receiver system and after an elapsed time period from when the encrypted data file was sent to the receiver system.

18. The requester system of claim 14, wherein the processor is further operable to:

receive a notification relating to an attempt, by the receiver system, at taking an action in relation to the data file;

generate, based on the notification, an instruction configured to deny the action; and send the instruction to the receiver system, wherein the sending of the instruction is configured to prevent the receiver system from completing the action.

19. A key management system, the system comprising:

a processor operable to:

receive, from a requester system, a request to generate a private encryption key and a public encryption key;

receive, from the requester system, identification information identifying a receiver system;

receive, from the requester system, use parameters;

generate a first private encryption key and a first public encryption key in response to receiving the request, the first encryption key being generated based upon the use parameters;

send the first private encryption key to the requester system; and send the first public encryption key to the receiver system.

20. The key management system of claim 19, wherein the use parameters specify an expiration date for the public encryption key.

21. The key management system of claim 19, wherein the processor is further operable to:

send an instruction specifying the use parameters to an application running on the receiver system, wherein the application controls access to an encrypted data file that was received from the requester system by the receiver system based on the instruction specifying the use parameters.

22. The key management system of claim 19, wherein the processor is further operable to:

generate one or more passcodes associated with the first private encryption key and the first public encryption key;

send at least one of the passcodes to the requester system; and send at least one of the passcodes to the receiver system.

23. A key management system, the system comprising:

a processor operable to:

receive, from a requester system, a request to generate a private encryption key and a public encryption key;

receive, from the requester system, identification information identifying a receiver system;

generate a first private encryption key and a first public encryption key in response to receiving the request;

send the first private encryption key to the requester system;

send the first public encryption key to the receiver system; and send an instruction specifying the use parameters to an application running on the receiver system, wherein the application controls access to an encrypted data file that was received from the requester system by the receiver system based on the instruction specifying the use parameters.

24. The key management system of claim 23, wherein the use parameters specify an expiration date for the public encryption key.

25. The key management system of claim 23, wherein the processor is further operable to:

generate one or more passcodes associated with the first private encryption key and the first public encryption key;

send at least one of the passcodes to the requester system; and send at least one of the passcodes to the receiver system.

* * * * *